(12) United States Patent
Matsushita

(10) Patent No.: US 8,358,847 B2
(45) Date of Patent: Jan. 22, 2013

(54) DISPLAY APPARATUS AND DISPLAY METHOD

(75) Inventor: Takashi Matsushita, Yokohama (JP)

(73) Assignee: Canon Kabushiki Kaisha (JP)

( * ) Notice: Subject to any disclaimer, the term of this patent is extended or adjusted under 35 U.S.C. 154(b) by 1024 days.

(21) Appl. No.: 12/348,503

(22) Filed: Jan. 5, 2009

(65) Prior Publication Data

US 2009/0175554 A1 Jul. 9, 2009

(30) Foreign Application Priority Data

Jan. 9, 2008 (JP) ................................ 2008-002516

(51) Int. Cl.
*G06K 9/00* (2006.01)
(52) U.S. Cl. .......................... 382/190; 382/152; 348/349
(58) Field of Classification Search .................. 382/190, 382/152; 348/349
See application file for complete search history.

(56) References Cited

U.S. PATENT DOCUMENTS

| | | | | |
|---|---|---|---|---|
| 5,759,044 A * | 6/1998 | Redmond | ................ | 434/307 R |
| 2002/0027199 A1 * | 3/2002 | Inada et al. | ................ | 250/311 |
| 2003/0031299 A1 * | 2/2003 | Ohishi | ................ | 378/162 |
| 2004/0061800 A1 * | 4/2004 | Yamazaki | ................ | 348/349 |
| 2005/0035293 A1 * | 2/2005 | Inada et al. | ................ | 250/311 |
| 2006/0093205 A1 * | 5/2006 | Bryll et al. | ................ | 382/152 |
| 2006/0097169 A1 * | 5/2006 | Inada et al. | ................ | 250/311 |
| 2006/0146174 A1 * | 7/2006 | Hagino | ................ | 348/349 |
| 2007/0052836 A1 | 3/2007 | Yamada et al. | | |

FOREIGN PATENT DOCUMENTS

| | | |
|---|---|---|
| JP | 06-113183 A | 4/1994 |
| JP | 07-143388 A | 6/1995 |
| JP | 2002-196225 A | 7/2002 |
| JP | 2003-153043 A | 5/2003 |
| JP | 2007-060328 A | 3/2007 |

OTHER PUBLICATIONS

Japanese Office Action for corresponding JP 2008-002516, mail date Feb. 7, 2012.

* cited by examiner

*Primary Examiner* — Hadi Akhavannik
(74) *Attorney, Agent, or Firm* — Rossi, Kimms & McDowell LLP

(57) ABSTRACT

A display apparatus able to perform appropriate and accurate focusing. An image displayed on a display unit is stored in a first storage unit, a focus position of the image is moved by a movement unit, and the image obtained after the focus position movement is stored in a second storage unit. The images stored in the first and second storage units are compared by a comparison unit on a pixel basis, and based on a result of the comparison, an image area where there is a change in pixel state is extracted by an extraction unit, a contrast value in the extracted image area is calculated by a calculation unit, and a change in the calculated contrast values is determined by a determination unit. Based on a result of the determination, the attribute of pixels in the extracted image area is changed by a change unit.

9 Claims, 12 Drawing Sheets

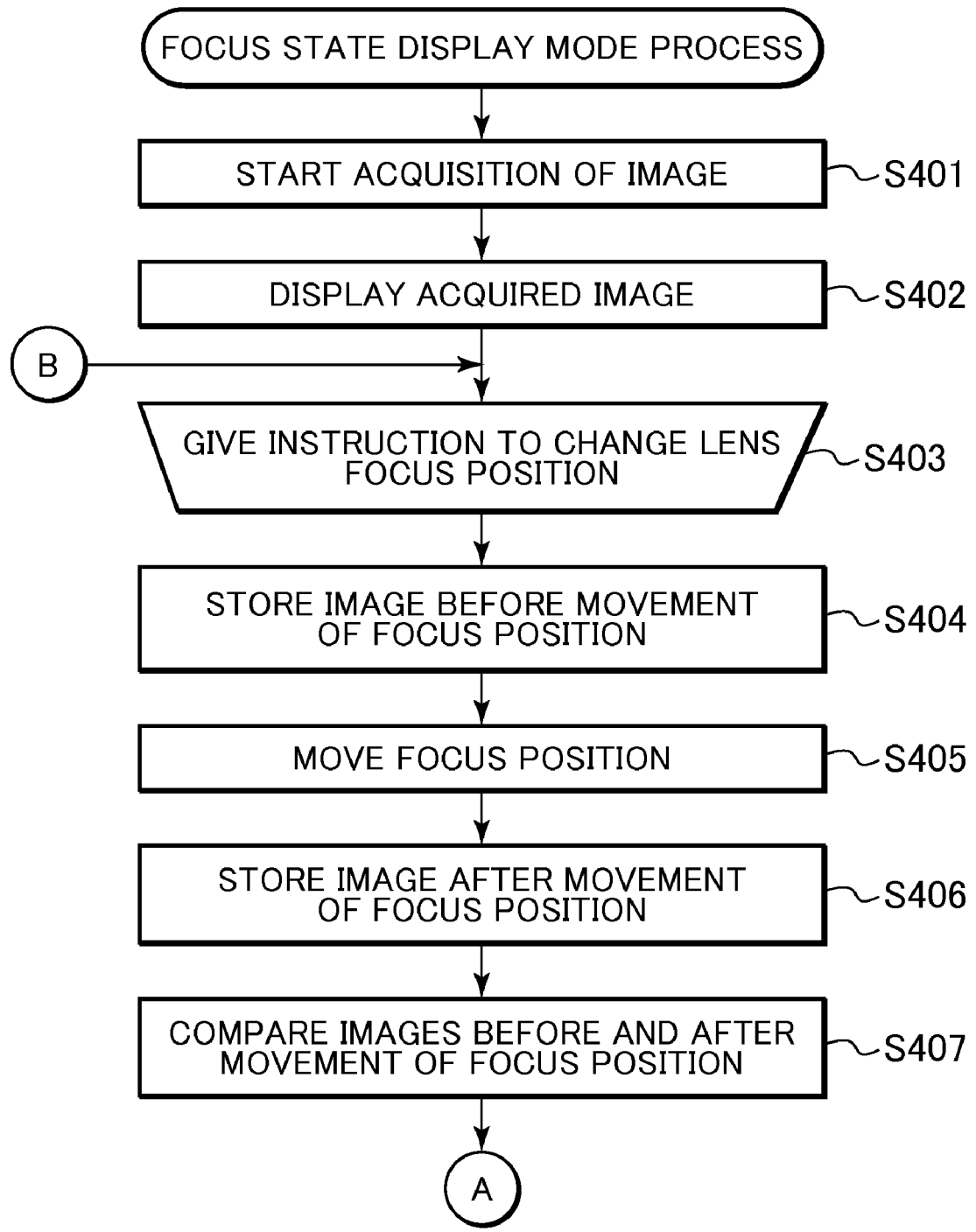

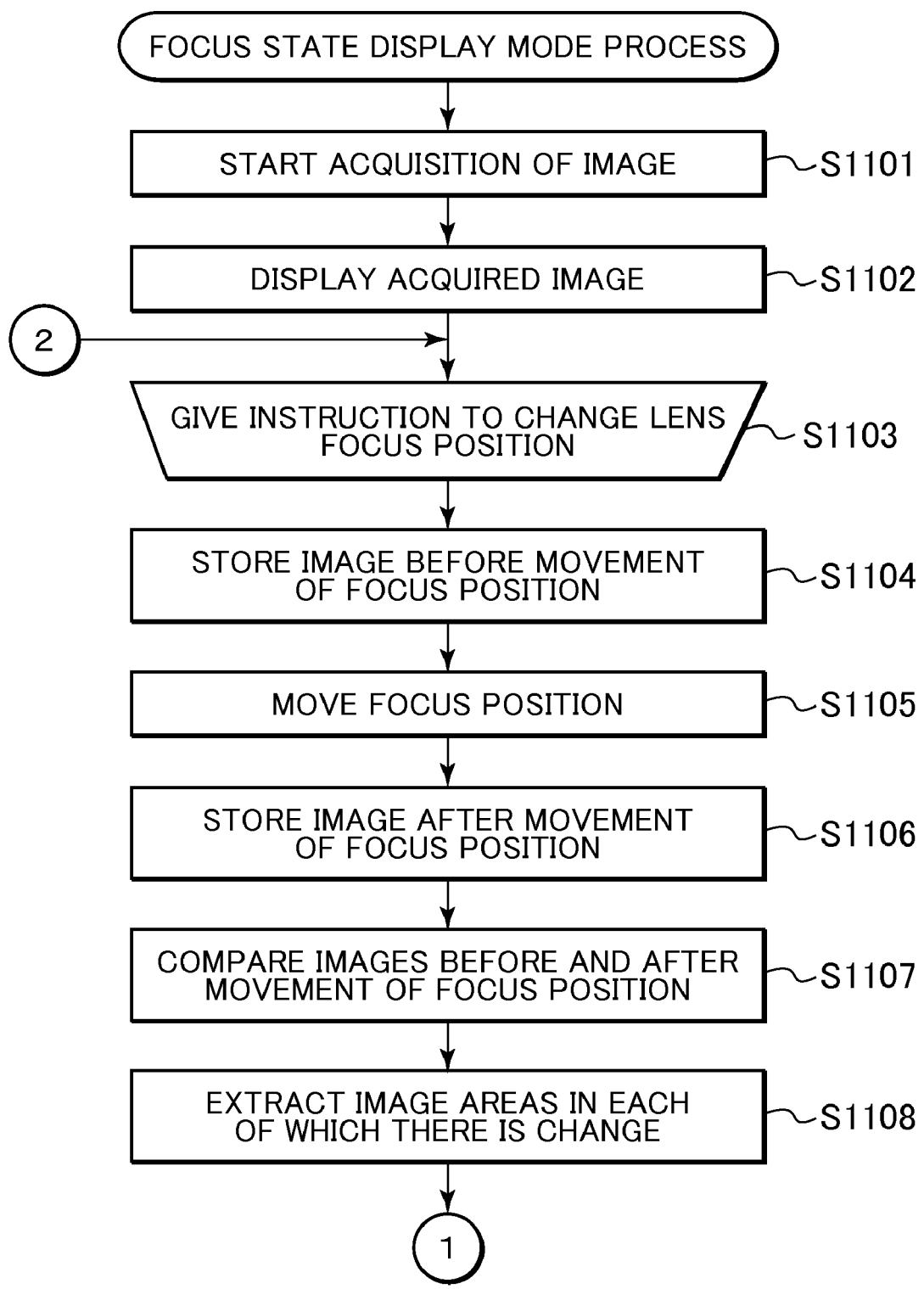

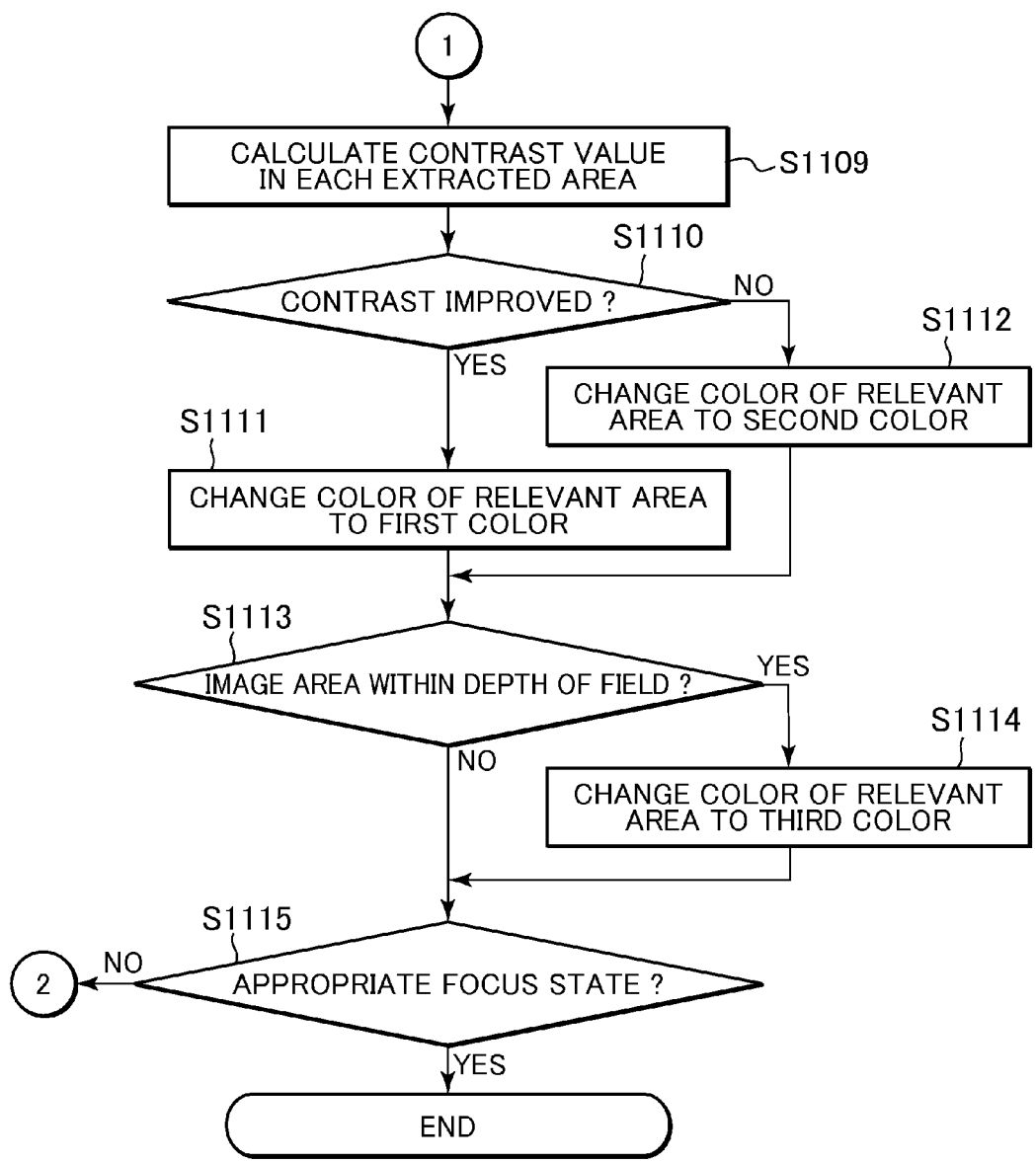

DISPLAY APPARATUS AND DISPLAY METHOD

BACKGROUND OF THE INVENTION

1. Field of the Invention

The present invention relates to a display apparatus and a display method for display of a focus state at the time of image picking-up (photography).

2. Description of the Related Art

For the purpose of clearly displaying a focus state, Japanese Laid-open Patent Publication No. 2002-196225 discloses a technique for detecting a focus state of a picked-up image in a high spatial frequency range and for displaying on the picked-up image the degree of the focus state using a color difference.

Also there are many proposals to display a focus state not on a picked-up image but on a separate member such as for example an LED.

With the apparatus proposed in Japanese Laid-open Patent Publication No. 2002-196225, it is possible to determine based on color an image part which is the best in the focus state. However, even when the best focus state cannot be attained by a focus operation, the direction in which the next focus operation should be made is not clearly indicated, which poses a problem.

With a technique to determine a color based on the magnitude of a contrast value, if the object is low in contrast, a color representative of an optimum focus state sometimes does not appear on a screen, making it difficult to find an optimum focus state.

Especially with a focus operation using buttons, switches, etc., it is not possible, unlike in a focus operation using a manual focus ring, etc., to locate an optimum position while changing the focus position back and forth. As a result, a tendency of an in-focus peak position being difficult to find becomes noticeable in a fine focus adjustment.

In practical photography, an aperture is usually controlled in consideration of the depth of field and thus whether or not the in-focus position is within the depth of field is sometimes more important than the in-focus peak position. However, means for solving that problem is not disclosed in Japanese Laid-open Patent Publication No. 2002-196225.

SUMMARY OF THE INVENTION

The present invention provides a display apparatus and a display method capable of performing appropriate and accurate focusing.

According to a first aspect of the present invention, there is provided a display apparatus comprising a display unit adapted to display an acquired image, a first storage unit adapted to store the image displayed on the display unit, a movement unit adapted to move a focus position after the image is stored in the first storage unit, a second storage unit adapted to store an image taken at the focus position moved by the movement unit, a comparison unit adapted to compare on a pixel basis the image stored in the first storage unit with the image stored in the second storage unit, an extraction unit adapted to extract an image area where there is a change in accordance with a result of comparison by the comparison unit, a calculation unit adapted to calculate a contrast value in the image area extracted by the extraction unit, a determination unit adapted to determine an increasing or decreasing change in the contrast value calculated by the calculation unit, and a change unit adapted to change an attribute of pixels in the image area extracted by the extraction unit in accordance with a result of determination by the determination unit.

According to a second aspect of the present invention, there is provided a display apparatus comprising a display unit adapted to display an acquired image, a first storage unit adapted to store the image displayed on the display unit, a movement unit adapted to move a focus position after the image is stored in the first storage unit, a second storage unit adapted to store an image taken at the focus position moved by the movement unit, a comparison unit adapted to compare on a pixel basis the image stored in the first storage unit with the image stored in the second storage unit, an extraction unit adapted to extract an image area where there is a change in accordance with a result of comparison by the comparison unit, a calculation unit adapted to calculate a contrast value in the image area extracted by the extraction unit, a first determination unit adapted to determine an increasing or decreasing change in the contrast value calculated by the calculation unit, a second determination unit adapted to determine whether or not the image area extracted by the extraction unit is within a depth of field, and a change unit adapted to change an attribute of pixels in the image area extracted by the extraction unit in accordance with results of determinations by the first and second determination units.

According to a third aspect of the present invention, there is provided a display apparatus comprising an instruction unit adapted to give an instruction to move a focus position, a determination unit adapted, after the instruction is given by the instruction unit, to determine an increasing or decreasing change in a contrast value between images before and after movement of the focus position, and a display unit adapted to display on either one of the images a state of change in the contrast value between the images, wherein the display unit provides different displays between when the contrast value increases and when the contrast value decreases.

According to a fourth aspect of the present invention, there is provided a display method comprising a display step of displaying an acquired image, a first storage step of storing the image displayed in the display step, a movement step of moving a focus position after the image is stored in the first storage step, a second storage step of storing an image taken at the focus position moved in the movement step, a comparison step of comparing on a pixel basis the image stored in the first storage step with the image stored in the second storage step, an extraction step of extracting an image area where there is a change in accordance with a result of comparison in the comparison step, a calculation step of calculating a contrast value in the image area extracted in the extraction step, a determination step of determining an increasing or decreasing change in the contrast value calculated in the calculation step, and a change step of changing an attribute of pixels in the image area extracted in the extraction step in accordance with a result of determination in the determination step.

According to a fifth aspect of the present invention, there is provided a display method comprising a display step of displaying an acquired image, a first storage step of storing the image displayed in the display step, a movement step of moving a focus position after the image is stored in the first storage step, a second storage step of storing an image taken at the focus position moved in the movement step, a comparison step of comparing on a pixel basis the image stored in the first storage step with the image stored in the second storage step, an extraction step of extracting an image area where there is a change in accordance with a result of comparison in the comparison step, a calculation step of calculating a contrast value in the image area extracted in the extraction step, a first determination step of determining an increasing or decreasing change in the contrast value calculated in the calculation step, a second determination step of determining whether or not the image area extracted in the extraction step is within a depth of field, and a change step of changing an attribute of pixels in the image area extracted in the extraction step in accordance with results of determinations in the first and second determination steps.

With the display apparatus and method of this invention, appropriate and accurate focusing can be carried out.

Further features of the present invention will become apparent from the following description of exemplary embodiments with reference to the attached drawings.

BRIEF DESCRIPTION OF THE DRAWINGS

FIGS. 4A and 4B are a flowchart showing the procedure of a focus state display mode process according to the first embodiment of this invention;

FIGS. 11A and 11B are a flowchart showing the procedure of a focus state display mode process according to the second embodiment of this invention.

DETAILED DESCRIPTION OF THE PREFERRED EMBODIMENTS

The present invention will now be described in detail below with reference to the drawings showing preferred embodiments thereof.

Figure 1:
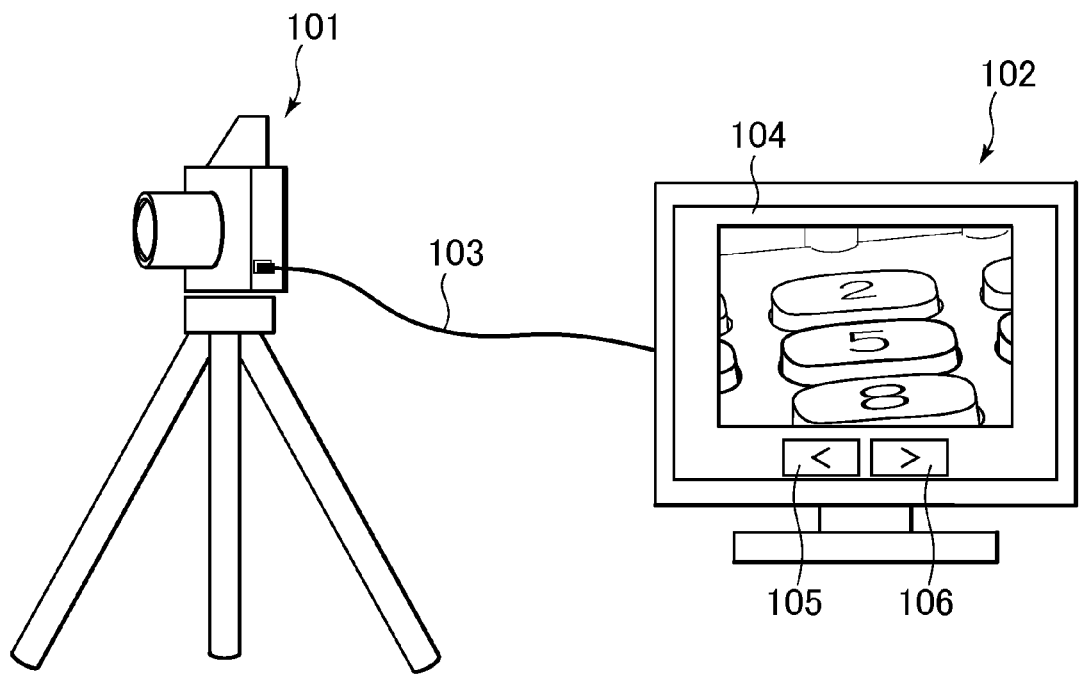
FIG. 1 is a view showing the construction of an image display system including a personal computer as a display apparatus according to a first embodiment of this invention and also including a camera connected to the personal computer.

FIG. 1 shows the construction of an image display system including a personal computer, which is a display apparatus according to a first embodiment of this invention, and a camera connected to the personal computer.

The image display system is configured by a camera 101 and a personal computer 102, which are connected via a cable 103 with each other. The camera 101 and the personal computer 102 may be connected not by the cable 103 but by wireless communication.

The personal computer 102 constituting the display apparatus is provided at its front surface with an image display section 104 below which a focus motion control button (near direction) 105 and a focus motion control button (far direction) 106 are provided as manipulation members (focus movement instruction unit) for moving the focus position forward and rearward.

An image captured by the camera 101 is transferred via the cable 103 to the personal computer 102 and displayed on the image display section 104. A user is able to move the focus by using the focus motion control buttons 105, 106 and confirm a focus state displayed on the image display section 104.

Figure 2:
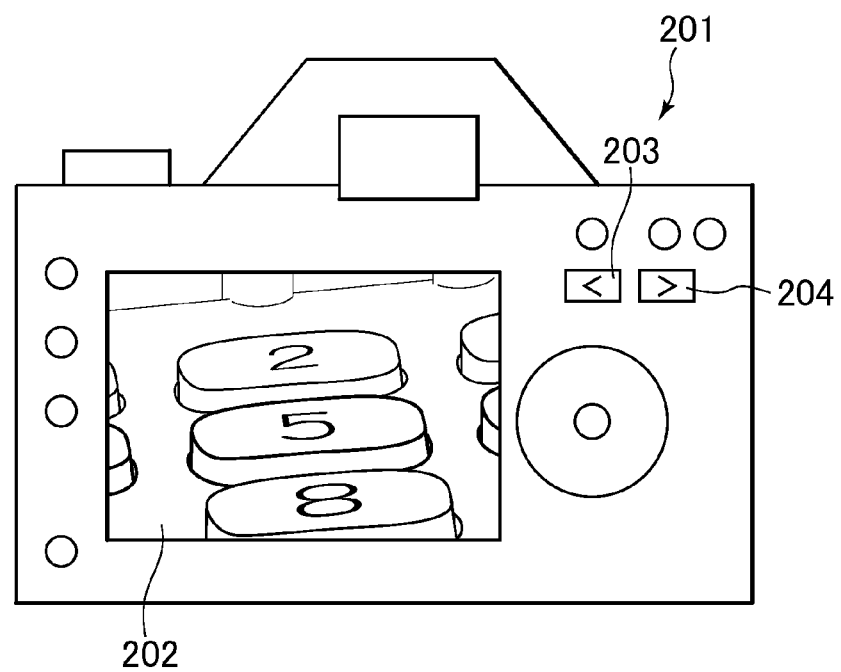
FIG. 2 is a rear view showing a camera as another type of display apparatus.

FIG. 2 shows in rear view a camera as another type of display apparatus.

A picked-up image is displayed on an image display section 202 of a camera 201. A user manipulates a focus motion control button (near direction) 203 and a focus motion control button (far direction) 204, and confirms a focus state displayed on the image display apparatus 202.

In a case that a lens is manually continuously driven, images before and after execution of focus movement are captured each time a position signal is obtained by position detecting means incorporated in a lens focus mechanism.

Figure 3:
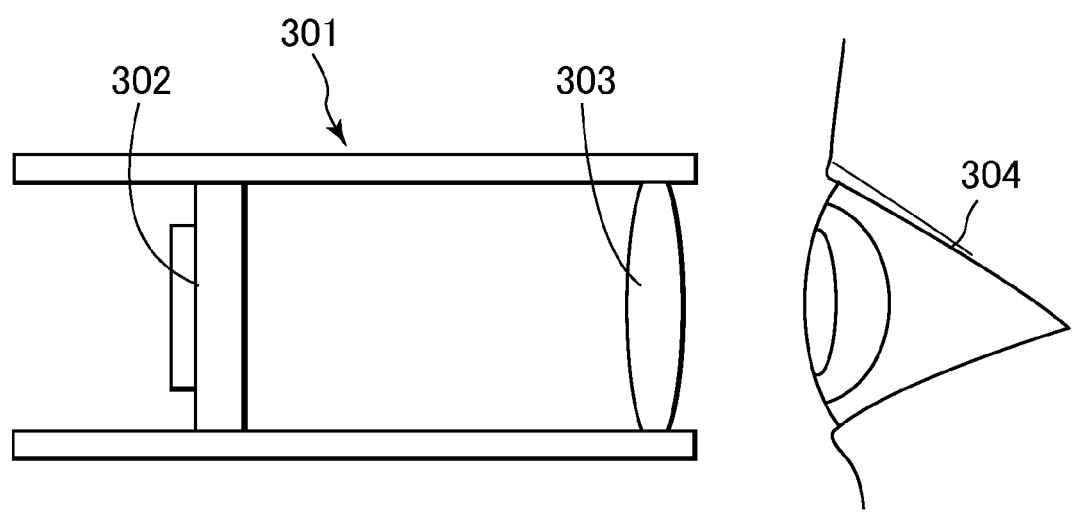
FIG. 3 is a view showing the construction of an electronic view finder as still another type of display apparatus.

FIG. 3 shows the construction of an electronic view finder, which is still another type of display apparatus.

A picked-up image is displayed on an image display section 302 of an electronic view finder 301. A viewer 304 observes an image displayed on the image display section 302 through an eyepiece lens 303.

Figure 4B:
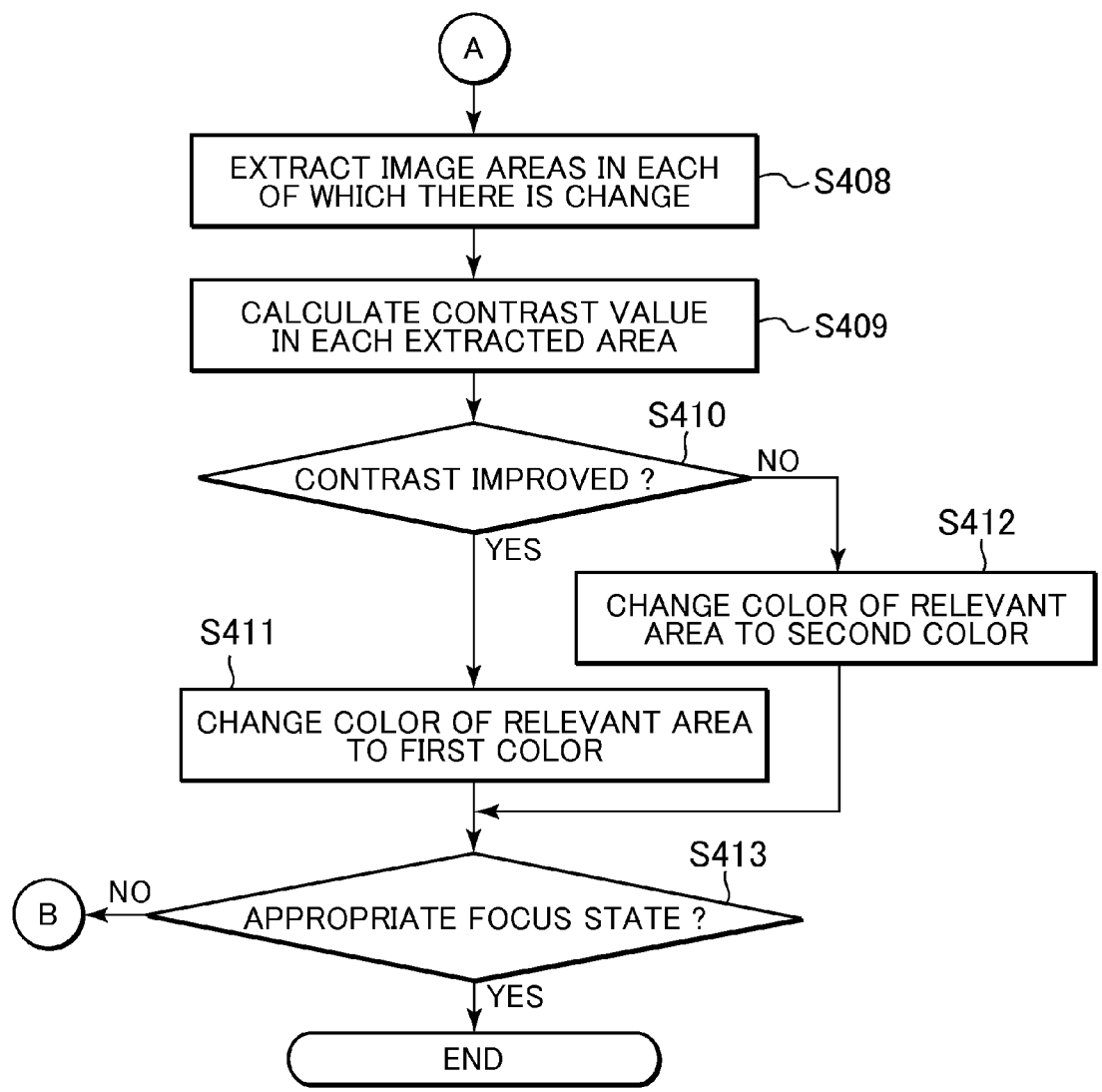

FIGS. 4A and 4B show in flowchart the procedure in a focus state display mode process according to the first embodiment of this invention.

In step S401, i.e., at start of the focus state display mode process, acquisition of a picked-up image is started.

In step S402, the acquired image is displayed on an image display section such as for example the image display section 104 in FIG. 1. At that time, a focus state is not displayed on a screen. However, a monochrome display may be started at this stage, as described later, for ease of recognition of a focus state change.

The step S402 functions as a display unit for displaying an acquired image.

In step S403, an instruction for changing a lens focus position is given when a focus movement instruction unit such as the focus motion control button 105 or 106 in FIG. 1 is manipulated.

In step S404, an image (FIG. 5) picked up at a stage where the focus change instruction is received is stored in a memory or the like.

The step S404 functions as a first storage unit for storing an image displayed on the display unit.

After the image is stored, the lens is moved by a predetermined amount (focus movement) in step S405.

The step S405 functions as a movement unit for moving the image focus position after an image is stored in the first storage unit.

In step S406, an image (FIG. 6) picked up immediately after execution of the focus movement is stored into a memory region of the memory which is different from a memory region used for the image storage in step S404.

The step S406 functions as a second storage unit for storing the image picked up at the focus position moved by the movement unit.

Figure 7:
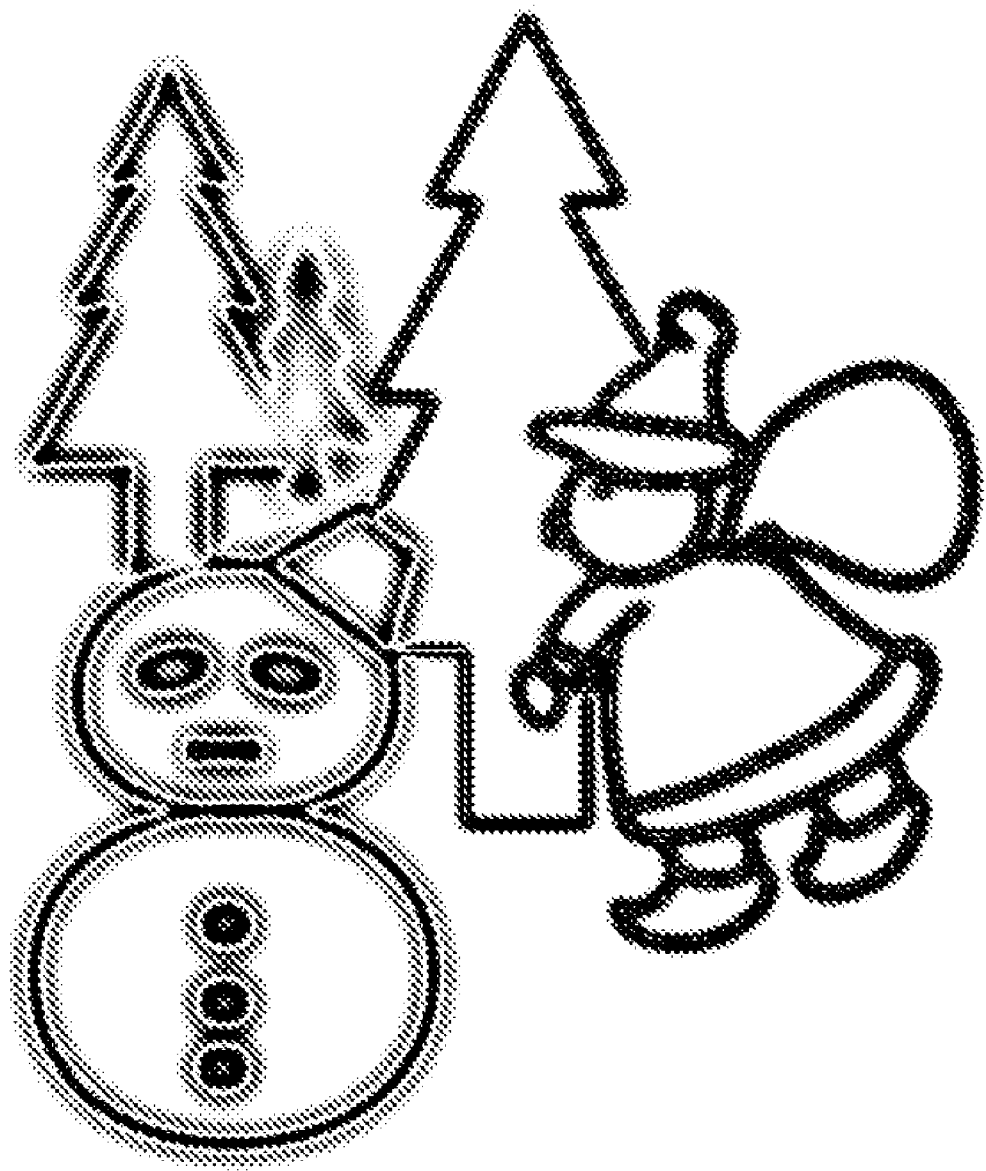
FIG. 7 is a view showing an example of areas in which a difference is present between before and after execution of the focus movement and which are displayed on either one of the image display sections in FIGS. 1 to 3.

In steps S407 and S408, the image stored before the focus movement is compared on a pixel basis with the image stored after the focus movement, and one or more image areas in each of which there is a change in pixel state are extracted (FIG. 7).

The step S407 functions as a comparison unit for comparing on a pixel basis the image stored in the first storage unit with the image stored in the second storage unit. The step S408 functions as an extraction unit for extracting, based on a result of the comparison by the comparison unit, one or more image areas where there is a change in pixel state.

In step S409, a contrast value in each extracted area in each of the images before and after execution of the focus movement is calculated (i.e., a contrast change in each extracted area is confirmed).

The step S409 functions as a calculation unit for calculating a contrast value in each image area extracted by the extraction unit.

In step S410, it is determined whether the contrast value calculated for each area is improved (becomes higher) or worsened (remain unchanged or becomes lower).

The step S410 functions as a determination unit (a first determination unit) for determining an increasing or decreasing change in the contrast value calculated by the calculation unit.

In a case where the calculated contrast value is improved, the color of one or more relevant areas is replaced by a first color or overlay-displayed with the first color (step S411). In a case where the contrast value is worsened, the color of one or more relevant areas is replaced by a second color or overlay-displayed with the second color (step S412).

The steps S411 and S412 function as a change unit for changing the attribute of pixels in each area extracted by the extraction unit in accordance with a result of determination by the determination unit.

In step S413, the focus state display mode process is completed, if the manipulation of the focus movement instruction unit is stopped by the user or operator who determines based on the displayed color that a further focus movement is unnecessary. If the manipulation of the focus movement instruction unit is continued by the user who determines that the focus state is not appropriate and a further focus movement is necessary, the flow proceeds to step S403. The processing in step S403 and the subsequent steps is therefore repeated in accordance with the operator's manipulation until the focus state is made appropriate.

Figure 5:
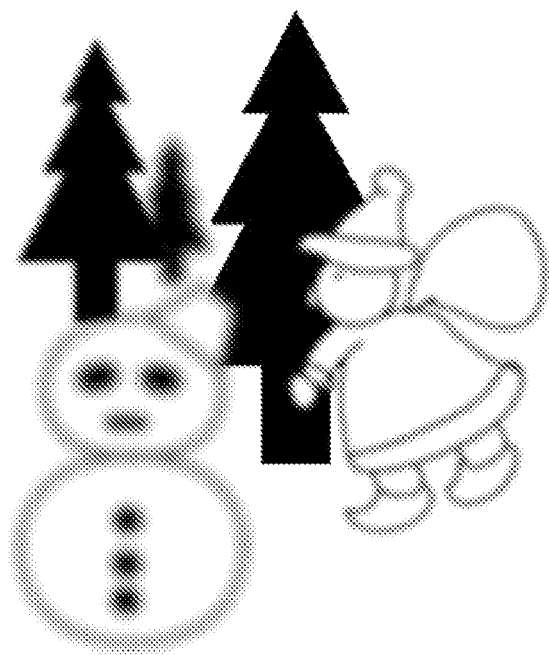
FIG. 5 is a view showing an example of an image displayed on either one of image display sections in FIGS. 1 to 3 before execution of focus movement.
Figure 6:
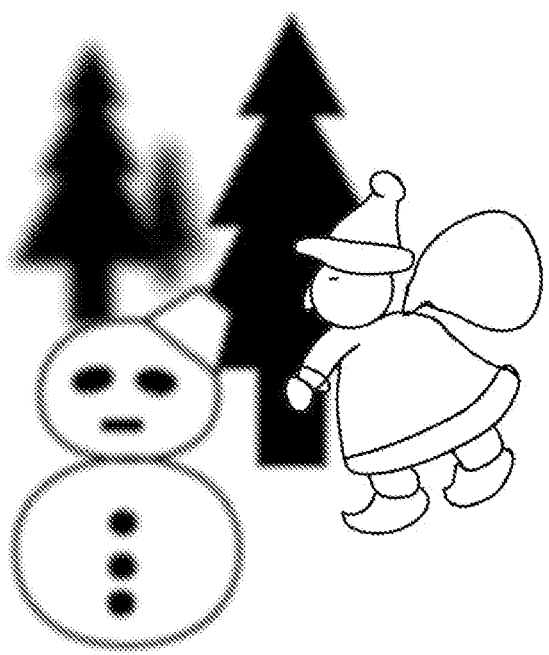
FIG. 6 is a view showing an example of an image displayed on either one of the image display sections shown in FIGS. 1 to 3 after execution of the focus movement.

FIG. 5 shows a picked-up image before execution of the focus movement manipulation. After the execution of the focus movement manipulation, a picked-up image as shown in FIG. 6 is obtained. FIG. 7 shows an example in which image areas where there is a change in pixel state are indicated in black color in accordance with a result of the pixel-based comparison between the picked-up images shown in FIGS. 5 and 6.

Figure 8A:
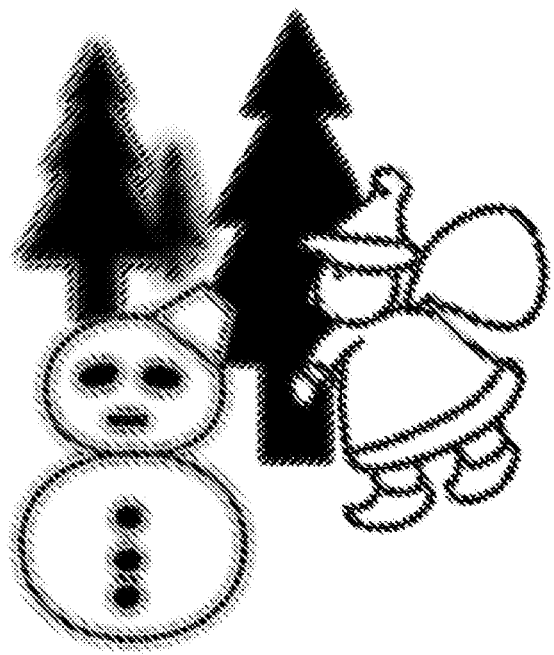
FIGS. 8A and 8B are views showing examples in each of which a display attribute used for display on either one of the image display sections in FIGS. 1 to 3 is changed.
Figure 8B:
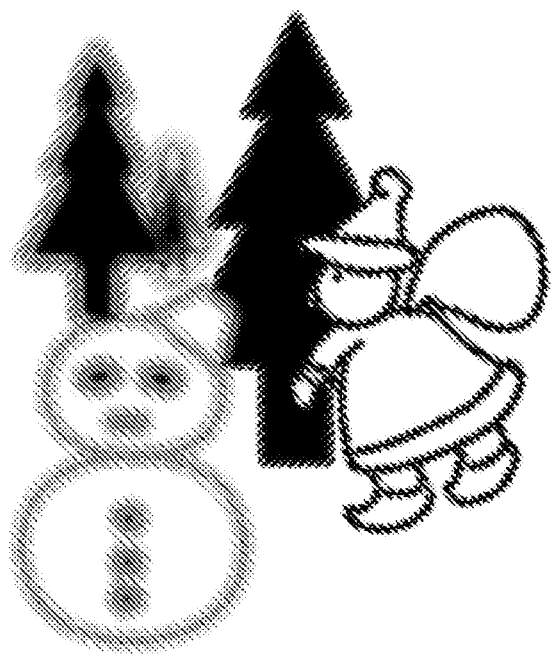

FIGS. 8A and 8B show cases where a change in focus state is represented by two colors. In FIGS. 8A and 8B, these two colors are represented by hatching for convenience of illustration. Specifically, a first color is indicated by hatching lines extending from upper left to lower right and a second color is indicated by hatching lines extending from lower left to upper right.

In the example in FIG. 8A, parts in which the focus state is improved and parts in which the focus state is worsened are represented simply by the two colors. In the example in FIG. 8B, the color intensity is changed according to the level of change so as to more emphasize the in-focus position.

Specifically, the contrast change rate becomes greater at positions closer to the in-focus position, and therefore such positions are represented by dark color. On the other hand, since the degree of out-of-focus in the original image is greater and the contrast change becomes smaller at positions more distant away from the in-focus position, such positions are represented by light color.

Figure 9:
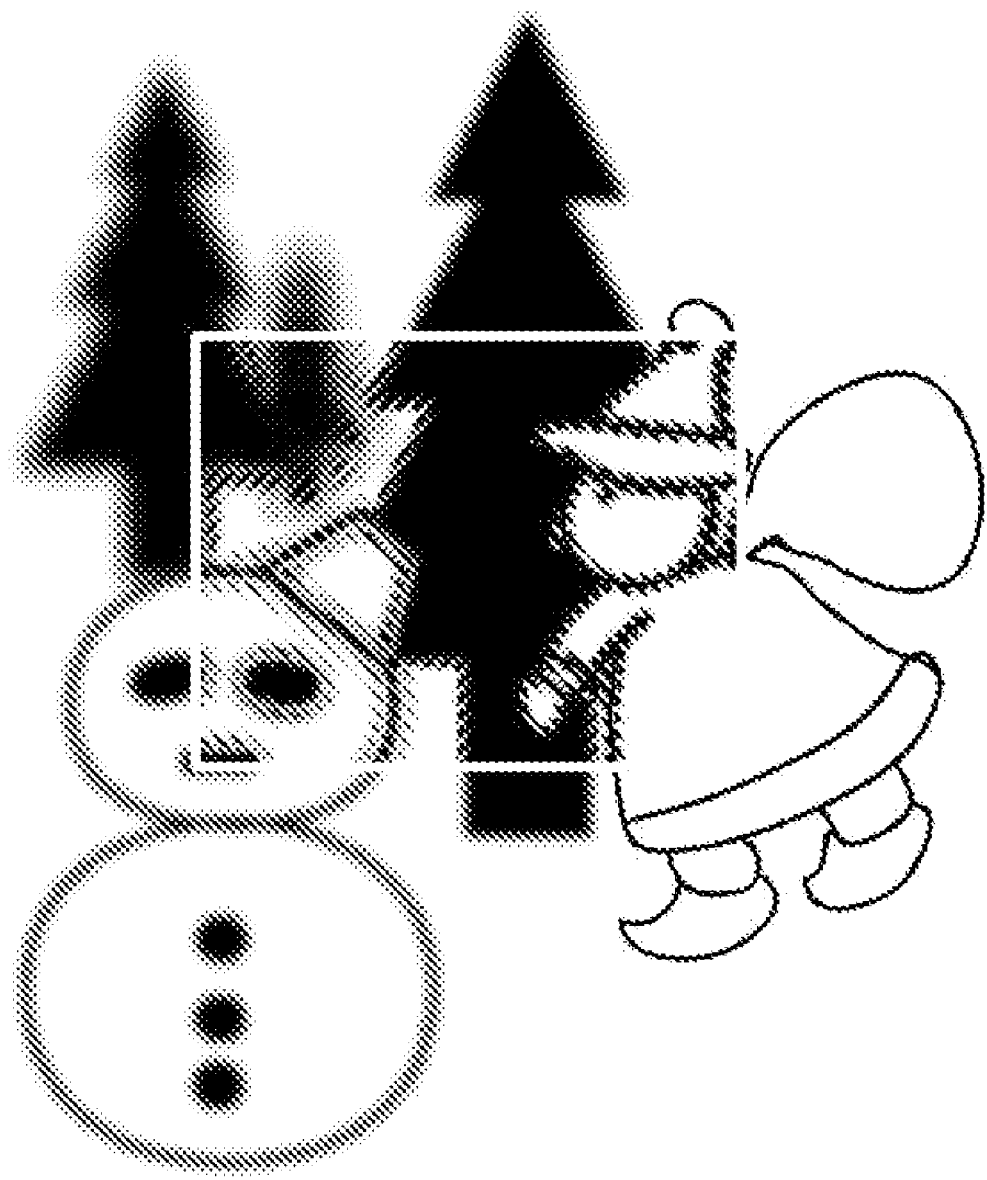
FIG. 9 is a view showing an example in which a display attribute used for display on either one of the image display sections in FIGS. 1 to 3 is changed for only part of image areas.

FIG. 9 shows a case where the focus state determination is not performed over the entire screen but is performed over a part of the image specified by the user. Also in FIG. 9, two colors are indicated by two sets of hatching lines extending in different directions. The comparison between focus states performed only partly is advantageous in that a memory capacity required for storage of picked-up images can be reduced and a processing speed can be improved.

Figure 10A:
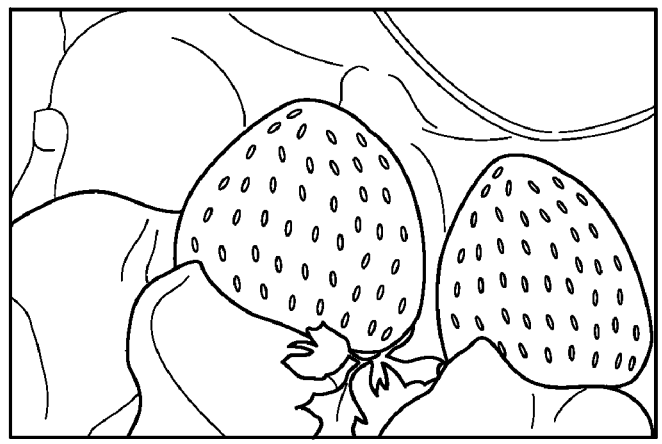
FIGS. 10A to 10C are views showing an example in which the original image is monochrome-displayed on either one of image display sections in FIGS. 1 to 3 to clarify a display attribute change.
Figure 10B:
Figure 10C:

In the case of a photographic subject which is bright in color, the representation in which a focus state change is indicated in different color is inappropriate since the focus state change is sometimes difficult to recognize. For example, in a case that the subject is a strawberry as shown in FIG. 10A and the red color is selected as a color for indicating a focus state change, the red color indicating the focus state change is difficult to distinguished from the red of the strawberry (FIG. 10B). In such a case, the original picked-up image is converted into a monochrome representation, and then a focus state change is indicated using the red color. As a result, the red color indicating the focus state change is not buried in the original image, making it easy to recognize the focus state as shown in FIG. 10C.

FIGS. 11A and 11B show in flowchart the procedure of a focus state display mode process according to a second embodiment of this invention.

The contents of processing in steps S1101 to S1112 in FIGS. 11A and 11B are the same as those in steps S401 to S412 in FIGS. 4A and 4B.

The second embodiment is characterized by the contents of processing in steps S1113 and S1114.

In step S1113, whether or not each image area is within a depth of field is determined.

The step S1113 functions as a second determination unit for determining whether or not each image area extracted by the extraction unit is within a depth of field.

In step S1114, if the image area is within the depth of field, the color of the image area is changed to a third color.

The step S1114 functions as a change unit for changing, based on a result of determination by the second determination unit, the attribute of pixels in the image area extracted by the extraction unit.

In photography, especially in short distance photography, the aperture is not wide open but generally somewhat closed so as to increase the depth of field.

Conventionally, the aperture is actually closed in order to confirm the depth of field. As a result, the in-focus position becomes difficult to find.

Figure 12:
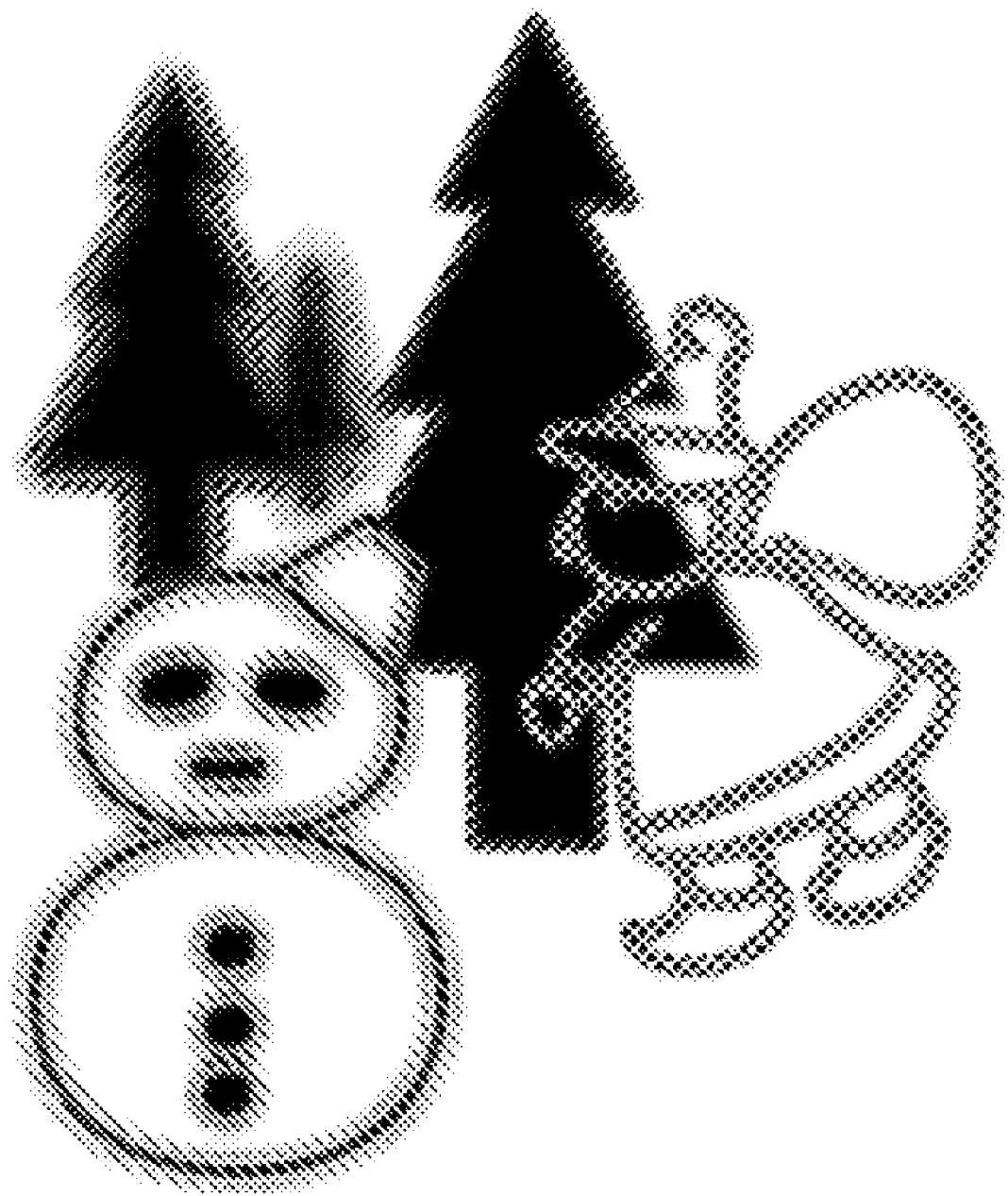
FIG. 12 is a view showing an example in which a display attribute used for display on either one of image display sections in FIGS. 1 to 3 is changed.

In the second embodiment of this invention, if the image area in which there is a change in focus state is within the depth of field, the color of the image area is changed to the third color, thereby making it easy to determine that the image area is within the depth of field. In the example in FIG. 12, the color of Santa Claus is changed to the third color. In FIG. 12, for convenience of illustration, the first color is represented by hatching lines extending from upper left to lower right, the second color is represented by hatching lines extending from lower left to upper right, and the third color is represented by a dot pattern.

Depending on cases, the first and second colors may not be used, and only the third color may be used for changing the color of the in-focus position. In that case, although the direction of focus operation cannot be recognized, but the in-focus range can easily be recognized, which is advantageous. Thus, it is preferable that at least one color should be selected depending on the intended purpose of use.

There are several methods for determining whether or not the image area is within the depth of field. In one exemplar method, the aperture is momentarily closed and a picked-up image is acquired, and the determination is performed by determining whether or not an out-of-focus amount of the acquired image falls within a predetermined minimum blur circle.

In another method, a ratio between an out-of-focus amount at a lens focus position in an aperture open state and an out-of-focus amount at aperture in actual photography is calculated. Then, the minimum blur circle is expanded in accordance with the ratio, and the determination is performed by determining whether or not the out-of-focus amount of a picked-up image falls within the expanded minimum blur circle.

In the first and second embodiments, the focus state is represented by color change. However, this invention is intended to permit the user to easily recognize the focus state, and therefore, the focus state may be represented by a display attribute change such as color inversion, brightness inversion, and hue change other than color change.

According to the embodiments of this invention, a focus state change caused by the focus movement manipulation can be emphasized. As a result, the user is fed back with information clearly showing the direction in which the focus movement manipulation should be made to attain a further satisfactory in-focus state, and therefore appropriate and accurate focusing can be carried out.

When the display is carried out in consideration of the depth of field, the user can perform focusing while confirming the desired in-focus range, without actually closing the lens aperture.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-002516, filed Jan. 9, 2008, which is hereby incorporated by reference herein in its entirety.

What is claimed is:

1. A display apparatus comprising:
   an acquiring unit configured to acquire a first image and a second image;
   a display unit configured to display each of the first image and the second image acquired by said acquiring unit; and
   a determination unit configured to extract a difference between a contrast value of the first image and a contrast value of the second image at an area of said display unit, and to determine whether or not the contrast value of the second image is greater than the contrast value of the first image,
   wherein the second image includes a first area in which the contrast value of the second image is determined to be greater than the contrast value of the first image and a second area in which the contrast value of the second image is determined not to be greater than the contrast value of the first image, and said display unit displays the first area and the second area in different attributes.

2. The display apparatus according to claim 1, wherein said display unit displays, in different attributes, the first area and the second area with a color of the first area and a color of the second area replaced by different colors, respectively.

3. The display apparatus according to claim 1, wherein said display unit displays, in different attributes, the first area and the second area with a color of the first area and a color of the second area overlay-displayed with different colors, respectively.

4. The display apparatus according to claim 1, wherein said display unit displays, in different attributes, the first area and the second area with brightness or a color of the first area and brightness or a color of the second area inversed.

5. The display apparatus according to claim 2, wherein said display unit displays the first area and the second area of the second image with the color of the first area and the color of the second area changed in intensity according to contrast difference value ratio of the contrast value of the second image and the contrast value of the first image.

6. The display apparatus according to claim 2, wherein said display unit displays the first area and the second area of the second image with the second image converted into a monochrome representation before the first area and the second area are replaced by different colors.

7. The display apparatus according to claim 1, further comprising a depth determination unit configured to determine whether or not each of the first area and the second area is within a depth of field of said acquiring unit,
   wherein said display unit changes an attribute used for displaying the first area and the second area according to a result of the determination by said depth determination unit.

8. An image display system having an image pickup apparatus and a display apparatus,
   the image pickup apparatus comprising:
   an acquiring unit configured to acquire a first image and a second image; and
   a focus movement unit configured to move a focus position of said acquiring unit,
   wherein said acquiring unit acquires the second image of which a focus position moved from a focus position of the first image by said focus movement unit after the first image had been acquired, and
   the display apparatus comprising:
   a display unit configured to display the each of the first image and the second image acquired by said acquiring unit; and
   a determination unit configured to extract a difference between a contrast value of the first image and a contrast value of the second image at an area of said display unit, and to determine whether or not the contrast value of the second image is greater than the contrast value of the first image,
   wherein the second image includes a first area in which the contrast value of the second image is determined to be greater than the contrast value of the first image and a second area in which the contrast value of the second image is determined not to be greater than the contrast value of the first image, and said display unit displays the first area and the second area in different attributes.

9. A display method comprising:
   an acquiring step of acquiring a first image and a second image;
   a display step of displaying, on a display unit, each of the first image and the second image acquired in said acquiring step; and a determination step of extracting a difference between a contrast value of the first image and a contrast value of the second image at an area of said display unit, and to determine whether or not the contrast value of the second image is greater than the contrast value of the first image, wherein the second image includes a first area in which the contrast value of the second image is determined to be greater than the contrast value of the first image and a second area in which the contrast value of the second image is determined not to be greater than the contrast value of the first image, and wherein said display step displaying the first area and the second area in different attributes on the display unit.

* * * * *